United States Patent
Yang et al.

(10) Patent No.: US 8,958,792 B2
(45) Date of Patent: Feb. 17, 2015

(54) METHOD AND SYSTEM FOR SELECTING MOBILITY MANAGEMENT ENTITY OF TERMINAL GROUP

(75) Inventors: Kun Yang, Shenzhen (CN); Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,087

(22) PCT Filed: Nov. 23, 2011

(86) PCT No.: PCT/CN2011/082731
§ 371 (c)(1),
(2), (4) Date: Sep. 11, 2012

(87) PCT Pub. No.: WO2012/151941
PCT Pub. Date: Nov. 15, 2012

(65) Prior Publication Data
US 2013/0203409 A1 Aug. 8, 2013

(51) Int. Cl.
*H04W 8/04* (2009.01)
(52) U.S. Cl.
CPC ................................ *H04W 8/04* (2013.01)
USPC ................................. 455/432.3; 455/435.1
(58) Field of Classification Search
USPC ............... 455/432.3, 435.1, 450; 370/328; 709/227
See application file for complete search history.

(56) References Cited

U.S. PATENT DOCUMENTS

| | | | |
|---|---|---|---|
| 2011/0064054 A1* | 3/2011 | Parsons et al. | 370/331 |
| 2011/0199969 A1 | 8/2011 | Yang | |
| 2012/0063430 A1* | 3/2012 | Suh et al. | 370/338 |
| 2012/0202491 A1* | 8/2012 | Fox et al. | 455/435.1 |
| 2013/0042011 A1* | 2/2013 | Sugizaki et al. | 709/227 |
| 2013/0208661 A1* | 8/2013 | Nylander et al. | 370/328 |

FOREIGN PATENT DOCUMENTS

| | | |
|---|---|---|
| CN | 101047950 A | 10/2007 |
| CN | 101047958 A | 10/2007 |

(Continued)

OTHER PUBLICATIONS

International Search Report dated Feb. 9, 2012 of PCT/CN2011/082731 (Concise Explanation of Relevance for Non-English Language Information: The Chinese Search Report Indicates That all of the Cited Prior Art if Only Background Relevance "A".).

(Continued)

*Primary Examiner* — Myron K Wyche
(74) *Attorney, Agent, or Firm* — Banner & Witcoff, Ltd.

(57) ABSTRACT

A method and system for selecting a Mobility Management Entity (MME) of a terminal group are disclosed in the invention, including: after receiving attach request message sent by a terminal, and determining that no effective subscription data of the terminal exist locally, the MME requesting the subscription data of the terminal from a Home Subscriber Server (HSS); after determining that an MME serving the terminal currently is not a group representative MME, the HSS returning terminal group management message and the subscription data of the terminal to that MME; that MME sending context information of the terminal to the group representative MME corresponding to a group representative MME identity in the terminal group management message, and sending attach accept message to the terminal; and the terminal taking the MME corresponding to the group representative MME identity in the attach accept message as a new MME serving the terminal currently.

15 Claims, 9 Drawing Sheets

(56) References Cited

FOREIGN PATENT DOCUMENTS

| CN | 101188862 A | 5/2008 |
|---|---|---|
| CN | 101355792 A | 1/2009 |
| WO | 2011/043571 A1 | 4/2011 |
| WO | 2011/089464 A | 7/2011 |

OTHER PUBLICATIONS

3GPP TS 23.401—3rd Generation Partnership Project; Technical Specificiation Group Services and System Aspects; General Packet Radio Service (GPRS) enhancements for Evolved Universal Terrestrial Radio Access Network (Release 10), Sep. 2011.

* cited by examiner

METHOD AND SYSTEM FOR SELECTING MOBILITY MANAGEMENT ENTITY OF TERMINAL GROUP

TECHNICAL FIELD

The present invention relates to Machine Type Communication (MTC) technology, and especially, to a method and system for selecting a Mobility Management Entity (MME) of a terminal group.

BACKGROUND OF THE RELATED ART

FIG. 1 is a structure diagram of a traditional cellular radio communication system, and as shown in FIG. 1, the cellular radio communication system mainly consists of a Core Network (CN), a Radio Access Network (RAN) and terminals. Wherein, the CN is responsible for non-access layer transactions such as terminal location update and so on, which are also anchors of a user plane. The RAN includes: base stations, or base stations and a base station controller, and is responsible for access layer transactions such as radio resource management and so on. Physical and logical connections can exist between the base stations according to the practical situation, such as a connection between base station 1 and base station 2 and a connection between base station 1 and base station 3 as shown in FIG. 1, and each base station can be connected to more than one CN node. A terminal, i.e. a User Equipment (UE), refers to various kinds of devices such as a mobile phone or notebook computer which can perform communication with a cellular radio communication network.

An MTC service refers to a service which performs communications between machines. In the MTC service, no people are required to participate, all communications are completed by the machines autonomously, and data are obtained through sensing devices such as a sensor, and then reported to a mobile communication network through a communication module, and connected to a public data network through the mobile communication network. The MTC service can include applications such as logistics monitoring, safety monitoring, tele-medicine detection and remote meter reading and so on. Data of the MTC service are managed by specific servers of mobile operators or special MTC operators, and can be checked by MTC users and MTC managers. In the process, the devices for acquiring the data required by the service are precisely the terminal.

The MTC service introduces a plurality of characteristics such as a Group characteristic and so on different from traditional mobile communications, and when the Group characteristic is activated, the operators' networks can optimize the amount of message of terminals which need to receive the same message based on the Group. The characteristic requires that, when the MTC users subscribe a certain terminal group, the operators set and activate the Group characteristic in subscriber information of each terminal of the terminal group, and store the set subscriber information of each terminal in a Home Subscriber Server (HSS). Here, the HSS is an entity which is responsible for saving identity information, authentication information and authorization information of a user or terminal device in a telecommunication network. According to different situations, the HSS can be used to save the identity information of the user and binding information of the subscriber and terminal device, or can only save the identity information of the user, or can only save the identity information of the terminal device. Wherein, when the HSS only saves the identity information of the user, the binding information of the user and terminal device can be saved by a gateway. In addition, the HSS is also responsible for a subscription database of the user and for executing identity authentication and authorization of the user. A service platform can query the subscriber information of the user or terminal device from the HSS.

In the related art, when a terminal attaches to a network, an MME obtains subscriber information of the terminal from an HSS and saves the subscriber information in local. Wherein, the MME is an entity used to manage user terminal control signalings in the core network and take charge of access control, including: authentication control, identity assignment, user identity and device identity verification, signaling plane encryption, consistency protection with evolved Node B (eNB), conversion of security parameters and Quality of Service (QoS) parameters between 2G/3G and Evolved Packet System (EPS), access grant control, decide whether be able to obtain the requested resources and reserve these resources, lawful interception, mobility management, session management, operations related to EPS bearer and network element selection and so on. Wherein, the identity assignment refers to Globally Unique Temporary Identity (GUTI) assignment and Tracking Area Identity List (TAI List) assignment and so on; the mobility management can be specifically implementing tracking and recording for the current location of the UE.

With regard to the Group characteristic of the MTC service, it is required that the network can perform control on selecting the MME of the terminal group, that is, according to the subscribed group information, the network should be able to provide a mechanism to enable the terminal group to select the same mobility management entity. However, in the related art, there is no such a technical scheme to enable the network to perform control on selecting the MME of the terminal group.

SUMMARY OF THE INVENTION

In view of this, the main object of the present invention is to provide a method and system for selecting an MME of a terminal group, which can perform control on selecting the MME of the terminal group effectively.

In order to achieve the foregoing objects, the technical scheme of the present invention is implemented as follows.

The present invention provides a method for selecting an MME of a terminal group, which comprises:

after receiving attach request message sent by a terminal, and determining that no effective subscription data of the terminal exist in local, the MME requesting the subscription data of the terminal from an HSS;

after determining that an MME serving the terminal currently is not a group representative MME, the HSS returning terminal group management message and the subscription data of the terminal to the MME serving the terminal currently;

the MME serving the terminal currently sending context information of the terminal to the group representative MME corresponding to a group representative MME identity in the terminal group management message, and sending attach accept message to the terminal; and the terminal taking the MME corresponding to the group representative MME identity in the attach accept message as a new MME serving the terminal currently.

In the above scheme, the method further comprises:

taking a terminal group identity as the subscription data of the terminal to store in the HSS.

In the above scheme, before the HSS determines that the MME serving the terminal currently is not the group representative MME, the method further comprises:

the HSS taking an MME serving a group representative terminal as the group representative MME.

In the above scheme, before the HSS takes the MME serving the group representative terminal as the group representative MME, the method further comprises:

the HSS designating the group representative terminal; or an MTC user and an operator subscribing to set the group representative terminal, and saving the set group representative terminal in the HSS.

In the above scheme, sending the context information of the terminal to the group representative MME corresponding to the group representative MME identity in the terminal group management message is:

the MME serving the terminal currently sending the context information of the terminal to the group representative MME through a signaling on an S10 reference point.

In the above scheme, taking the MME corresponding to the group representative MME identity in the attach accept message as the new MME serving the terminal currently is:

the terminal updating a current serving MME identity in locally stored information as the group representative MME identity.

The present invention further provides a method for selecting an MME of a terminal group, which comprises:

after receiving attach request message sent by a terminal, and determining that no effective subscription data of the terminal exist in local, the MME requesting the subscription data of the terminal from an HSS;

after determining that an MME serving the terminal currently is not a group representative MME, the HSS sending terminal group management message to the group representative MME, and returning the subscription data of the terminal to the MME serving the terminal currently;

the group representative MME acquiring context information of the terminal from the MME serving the terminal currently according to the terminal group management message, and the MME serving the terminal currently storing the received subscription data and sending attach accept message to the terminal; and the terminal taking the MME corresponding to a group representative MME identity in the attach accept message as a new MME serving the terminal currently.

In the above scheme, sending the terminal group management message to the group representative MME is:

the HSS sending the terminal group management message to the group representative MME through a signaling on an S6a reference point.

In the above scheme, acquiring the context information of the terminal from the MME serving the terminal currently is:

the group representative MME sending terminal context request message to the MME serving the terminal currently through a signaling on an S10 reference point;

the MME serving the terminal currently providing the context information of the terminal for the group representative MME by sending terminal context request acknowledgment message to the group representative MME.

The present invention further provides a system for selecting an MME of a terminal group, which comprises: a first MME, an HSS, a second MME and terminals; wherein, the first MME is configured to: after receiving attach request message sent by the terminal, and determining that no effective subscription data of the terminal exist in local, request the subscription data of the terminal from the HSS, and after receiving terminal group management message and the subscription data of the terminal returned by the HSS, send context information of the terminal to the second MME, and send attach accept message to the terminal;

the HSS is configured to: after determining that the first MME is not a group representative MME, return the terminal group management message and the subscription data of the terminal to the first MME;

the second MME is configured to: receive the context information of the terminal sent by the first MME; and the terminal is configured to: send the attach request message to the first MME, and after receiving the attach accept message sent by the first MME, take the second MME as a new MME serving the terminal currently.

In the above scheme, the HSS is further configured to: take an MME serving a group representative terminal as the group representative MME.

The present invention further provides a system for selecting an MME of a terminal group, which comprises: a first MME, an HSS, a second MME and terminals; wherein, the first MME is configured to: after receiving attach request message sent by the terminal, and determining that no effective subscription data of the terminal exist in local, request the subscription data of the terminal from the HSS, store the received subscription data of the terminal returned by the HSS, send attach accept message to the terminal, and provide context information of the terminal for the second MME;

the HSS is configured to: after determining that the first MME is not a group representative MME, send terminal group management message to the second MME, and return the subscription data of the terminal to the first MME;

the second MME is configured to: after receiving the terminal group management message sent by the HSS, according to the terminal group management message, acquire the context information of the terminal from the first MME; and the terminal is configured to: send the attach request message to the first MME, and after receiving the attach accept message sent by the first MME, take the second MME as a new MME serving the terminal currently.

With the method and system for selecting the MME of the terminal group provided by the present invention, after receiving attach request message sent by a terminal, and determining that no effective subscription data of the terminal exist in local, the MME requests the subscription data of the terminal from an HSS; after determining that an MME serving the terminal currently is not a group representative MME, the HSS returns terminal group management message and the subscription data of the terminal to the MME serving the terminal currently; the MME serving the terminal currently sends context information of the terminal to the group representative MME in the terminal group management message, and sends attach accept message to the terminal; and the terminal takes the MME corresponding to a group representative MME identity in the attach accept message as a new MME serving the terminal currently. Or, after receiving attach request message sent by a terminal, and determining that no effective subscription data of the terminal exist in local, the MME requests the subscription data of the terminal from an HSS; after determining that an MME serving the terminal currently is not a group representative MME, the HSS sends terminal group management message to the group representative MME, and returns the subscription data of the terminal to the MME serving the terminal currently; the group representative MME acquires context information of the terminal from the MME serving the terminal currently according to the terminal group management message, and the MME serving the terminal currently stores the received subscription data and sends attach accept message to the terminal; and the terminal takes the MME corresponding to a group representative MME identity in the attach accept message as a new MME serving the terminal currently. Therefore, according to the subscribed group information, the network can perform an effective control on selecting the MME of the terminal group, thereby satisfying the demand of the Group characteristic of MTC service.

PREFERRED EMBODIMENTS OF THE PRESENT INVENTION

The present invention will be further described in detail in combination with the accompanying drawings and examples below.

Figure 1:
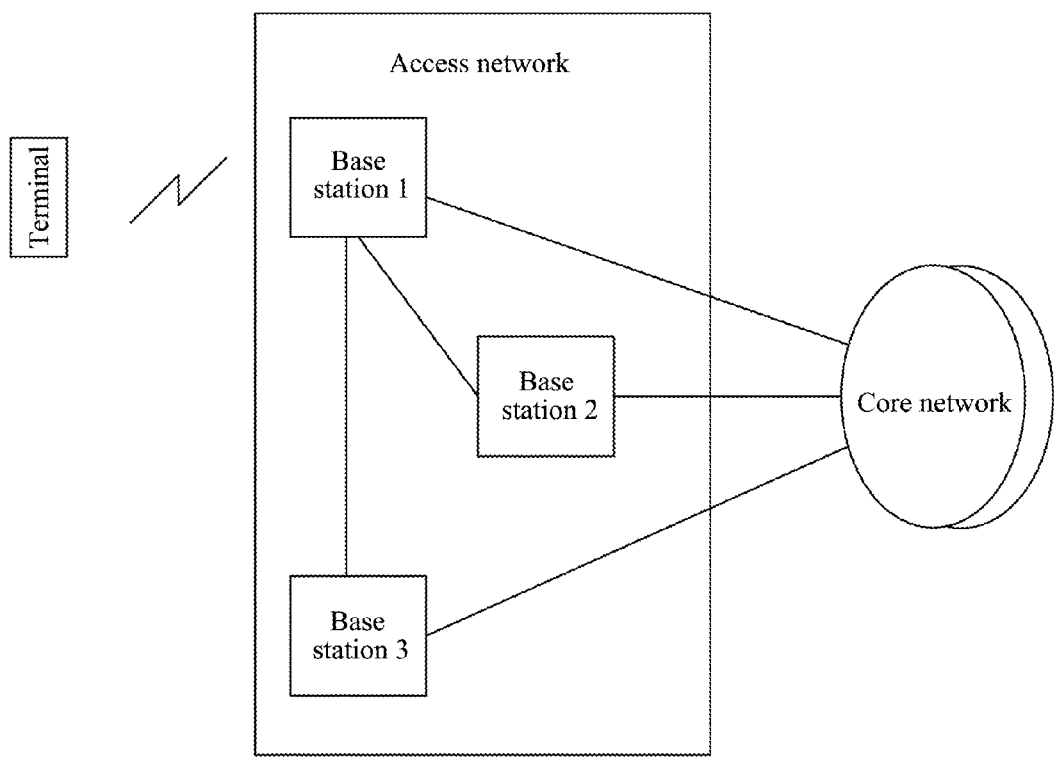
FIG. 1 is a structure diagram of a traditional cellular radio communication system.
Figure 2:
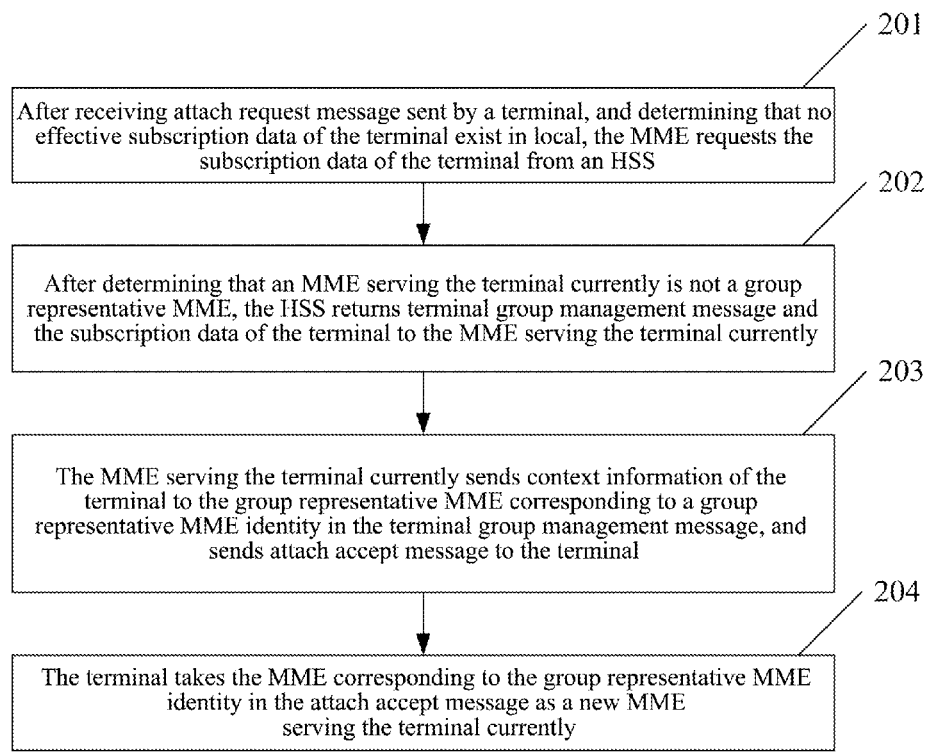
FIG. 2 is a flow diagram of the method for selecting an MME of a terminal group according to the present invention.

The method for selecting an MME of a terminal group according to the present invention as shown in FIG. 2 includes following steps.

In step 201, after receiving attach request message sent by a terminal, and determining that no effective subscription data of the terminal exist in local, the MME requests the subscription data of the terminal from an HSS.

Here, the related art can be used in the specific processing process of the MME determining that no effective subscription data of the terminal exist in local.

Before executing the step, the method can further include: taking a terminal Group Identity as the subscription data of the terminal to store in the HSS.

Before executing the step, the method can further include: the terminal sending the attach request message to an MME serving the terminal currently.

Requesting the subscription data of the terminal from the HSS is specifically:
requesting the subscription data of the terminal from the HSS through location update request message.

In step 202, after determining that the MME serving the terminal currently is not a group representative MME, the HSS returns terminal group management message and the subscription data of the terminal to the MME serving the terminal currently.

Here, before the HSS determines that the MME serving the terminal currently is not the group representative MME, the method can further include:
the HSS taking an MME serving a group representative terminal as the group representative MME.

Wherein, before the HSS takes the MME serving the group representative terminal as the group representative MME, the method can further include:
the HSS designating the group representative terminal; or
an MTC user and an operator subscribing to set the group representative terminal, and saving the set group representative terminal in the HSS.

The terminal group management message includes: a terminal identity and a group representative MME identity.

Returning the terminal group management message and the subscription data of the terminal to the MME serving the terminal currently is specifically:
returning the terminal group management message and the subscription data of the terminal to the MME serving the terminal currently through location update acknowledgment message.

After determining that the MME serving the terminal currently is the group representative MME, the HSS also returns the terminal group management message and the subscription data of the terminal to the MME serving the terminal currently.

In step 203, the MME serving the terminal currently sends context information of the terminal to the group representative MME corresponding to the group representative MME identity in the terminal group management message, and sends attach accept message to the terminal.

Here, sending the context information of the terminal to the group representative MME corresponding to the group representative MME identity in the terminal group management message is specifically:
the MME serving the terminal currently sending the context information of the terminal to the group representative MME through a signaling on an S10 reference point. Wherein, the signaling on the S10 reference point can be specifically a User Datagram Protocol signaling and so on.

The attach accept message includes: a subscriber characteristic of the terminal, terminal Group Identity and group representative MME identity information.

When the group representative MME in the terminal group management message is the MME serving the terminal currently, the MME serving the terminal currently does not send the context information of the terminal.

In step 204, the terminal takes the MME corresponding to the group representative MME identity in the attach accept message as a new MME serving the terminal currently.

Specifically, the terminal updates a current serving MME identity in locally stored information as the group representative MME identity.

After the terminal updates the current serving MME identity in the locally stored information as the group representative MME identity, it is indicated that the terminal takes the MME corresponding to the group representative MME identity in the attach accept message as the new MME serving the terminal currently.

Correspondingly, if the MME serving the terminal currently is the group representative MME, the terminal does not execute any operations.

Figure 3:
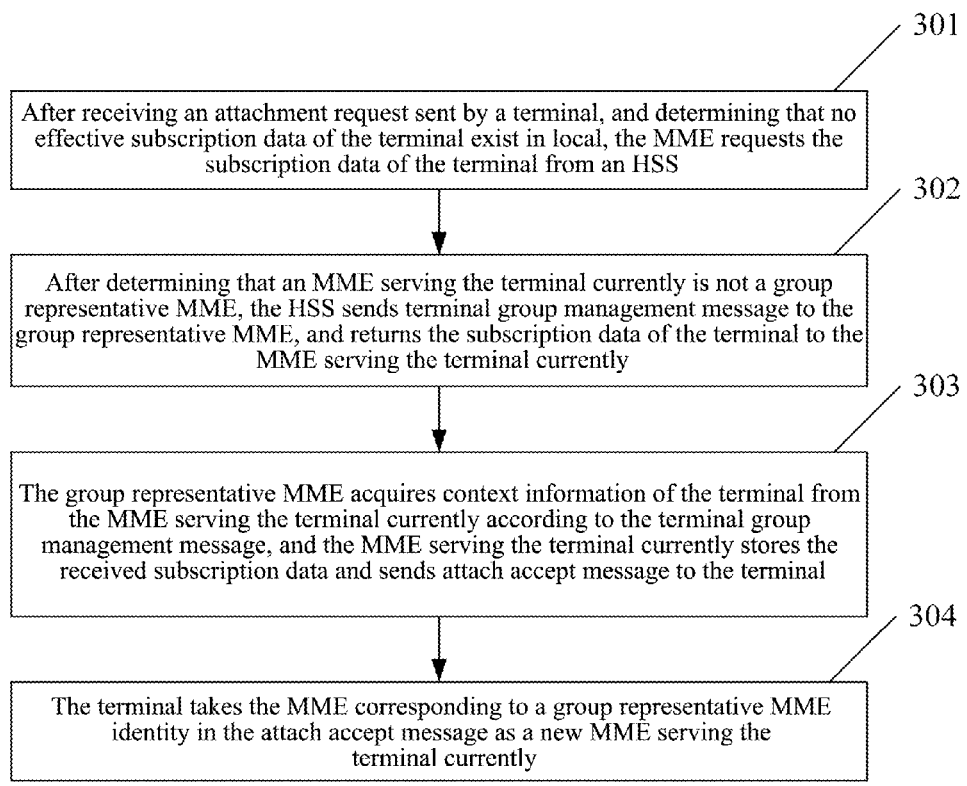
FIG. 3 is a flow diagram of the method for selecting an MME of a terminal group according to the present invention.

The present invention also provides a method for selecting an MME of a terminal group, and as shown in FIG. 3, following steps are included.

In step 301, after receiving attach request message sent by a terminal, and determining that no effective subscription data of the terminal exist in local, the MME requests the subscription data of the terminal from an HSS.

Here, the related art can be used in a specific processing process of the MME determining that no effective subscription data of the terminal exist in local.

Before executing the step, the method can further include: taking a terminal Group Identity as the subscription data of the terminal to store in the HSS.

Before executing the step, the method can further include: the terminal sending the attach request message to an MME serving the terminal currently.

Requesting the subscription data of the terminal from the HSS is specifically:

requesting the subscription data of the terminal from the HSS through location update request message.

In step 302, after determining that the MME serving the terminal currently is not a group representative MME, the HSS sends terminal group management message to the group representative MME, and returns the subscription data of the terminal to the MME serving the terminal currently.

Here, before the HSS determines that the MME serving the terminal currently is not the group representative MME, the method can further include:

the HSS taking an MME serving a group representative terminal as the group representative MME.

Wherein, before the HSS takes the MME serving the group representative terminal as the group representative MME, the method can further include:

the HSS designating the group representative terminal; or an MTC user and an operator subscribing to set the group representative terminal, and saving the set group representative terminal in the HSS.

Sending the terminal group management message to the group representative MME is specifically:

the HSS sending the terminal group management message to the group representative MME through a signaling on an S6a reference point. Wherein, the signaling on the S6a reference point can be specifically Insert Subscriber data message and so on. The S6a reference point refers to: a reference point between the HSS and MME, which is used for information interaction between the HSS and MME.

The terminal group management message includes: a terminal identity and an MME identity serving the terminal currently.

Returning the subscription data of the terminal to the MME serving the terminal currently is specifically:

returning the subscription data of the terminal to the MME serving the terminal currently through location update acknowledgment message.

After determining that the MME serving the terminal currently is the group representative MME, the HSS returns the terminal group management message and the subscription data of the terminal to the MME serving the terminal currently.

In step 303, the group representative MME acquires context information of the terminal from the MME serving the terminal currently according to the terminal group management message, and the MME serving the terminal currently stores the received subscription data and sends attach accept message to the terminal.

Here, acquiring the context information of the terminal from the MME serving the terminal currently is specifically:

the group representative MME sending terminal context request message to the MME serving the terminal currently through a User Datagram Protocol signaling on an S10 reference point;

the MME serving the terminal currently providing the context information of the terminal for the group representative MME by sending terminal context request acknowledgment message to the group representative MME.

The attach accept message includes: a subscriber characteristic of the terminal, terminal Group Identity and group representative MME identity information.

When the group representative MME in the terminal group management message is the MME serving the terminal currently, the MME serving the terminal currently does not send the context information of the terminal.

In step 304, the terminal takes the MME corresponding to the group representative MME identity in the attach accept message as a new MME serving the terminal currently.

Specifically, the terminal updates a current serving MME identity in locally stored information as the group representative MME identity.

After the terminal updates the current serving MME identity in the locally stored information as the group representative MME identity, it is indicated that the terminal takes the MME corresponding to the group representative MME identity in the attach accept message as a new MME serving the terminal currently.

Correspondingly, if the MME serving the terminal currently is the group representative MME, the terminal does not execute any operations.

The present invention will be further described in detail again in combination with the examples below.

EXAMPLE 1

Figure 4:
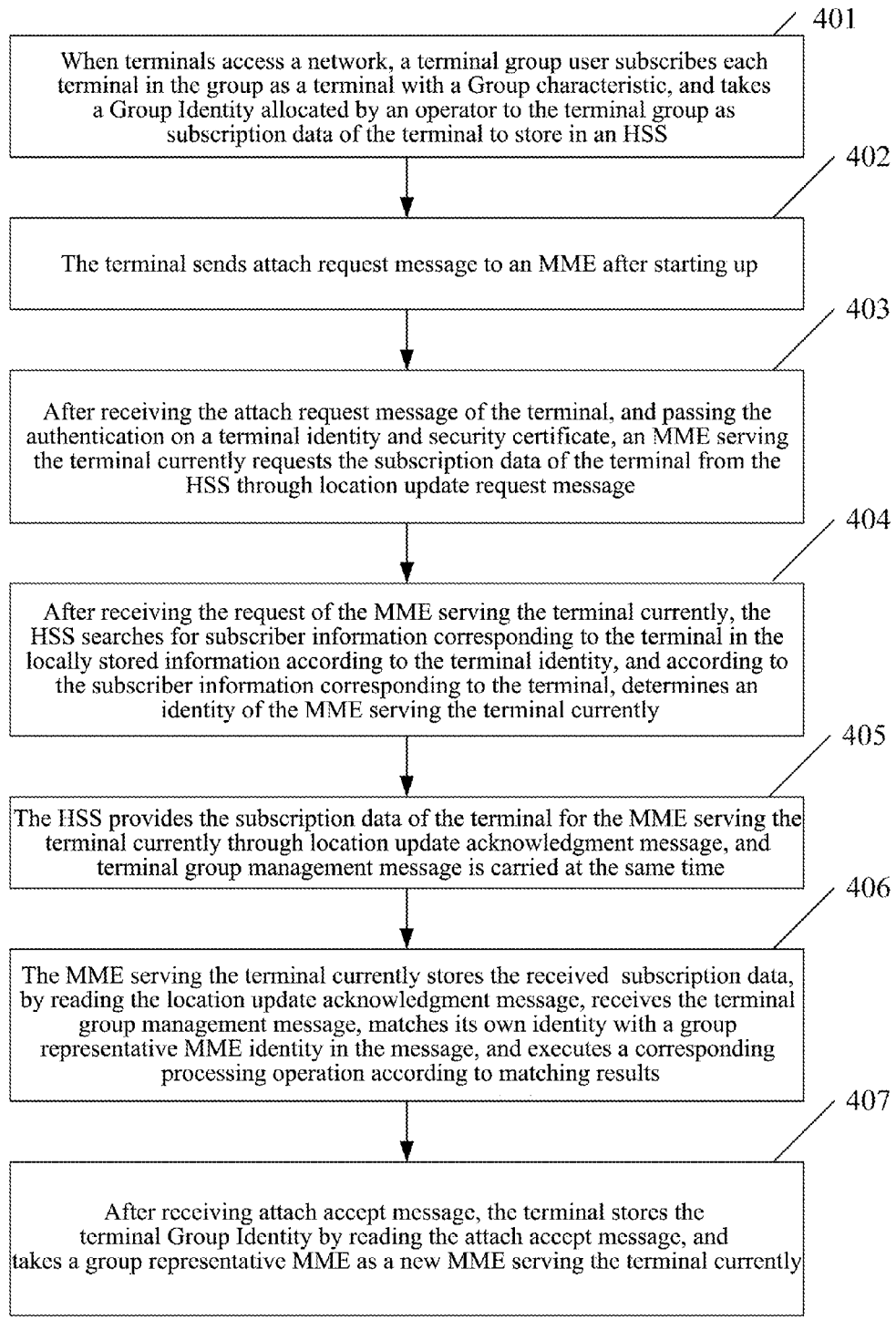
FIG. 4 is a flow diagram of the method for selecting an MME of a terminal group according to the example 1.

An application scenario of the example is that: a group representative terminal is designated by an HSS, the method for selecting an MME of a terminal group according to the example as shown in FIG. 4 includes following steps.

In step 401, when terminals access a network, a terminal group user subscribes each terminal in the group as a terminal with a Group characteristic, and takes a Group Identity allocated by an operator to the terminal group as subscription data of the terminal to store in the HSS.

In step 402, the terminal sends attach request message to the MME after starting up.

Here, the request includes: a terminal identity and a security certificate.

In step 403, after receiving the attach request message of the terminal, and passing the authentication on the terminal identity and security certificate, an MME serving the terminal currently requests the subscription data of the terminal from the HSS through location update request message.

Here, the location update request message includes: a terminal identity and an MME identity; wherein, the terminal identity can be specifically an International Mobile Subscriber Identification Number (IMSI); the MME identity can be specifically a Globally Unique MME Identifier (GUMMEI).

In step 404, after receiving the request of the MME serving the terminal currently, the HSS searches for subscriber information corresponding to the terminal in the locally stored information according to the terminal identity, and according to the subscriber information corresponding to the terminal, determines an identity of the MME serving the terminal currently.

Here, the subscriber information corresponding to the terminal includes: the terminal Group Identity.

According to the subscriber information corresponding to the terminal, determining the identity of the MME serving the terminal currently is specifically:

if the terminal is the group representative terminal designated by the HSS, and the terminal is the first attached terminal of the terminal group, the HSS takes the MME serving the terminal currently as a group representative MME;

if the terminal is the group representative terminal designated by the HSS, and the terminal is not the first attached terminal of the terminal group, or the terminal is not the group representative terminal, the HSS takes the MME serving the terminal currently as a common MME.

Wherein, the HSS will save the identity of the first attached terminal in the terminal group in which the terminal is located, and it hereby can acquire whether the terminal is the first attached terminal of the terminal group accordingly.

In step 405, the HSS provides the subscription data of the terminal for the MME serving the terminal currently through location update acknowledgment message, and meanwhile, terminal group management message is carried.

Here, the terminal group management message includes: a group representative MME identity and a terminal identity; wherein, the group representative MME identity can be specifically the GUMMEI; the terminal identity can be the IMSI.

In step 406, the MME serving the terminal currently stores the received subscription data, by reading the location update acknowledgment message, receives the terminal group management message, matches its own identity with the group representative MME identity in the message, and executes a corresponding processing operation according to matching results.

Specifically, when the matching is determined, the MME serving the terminal currently sends attach accept message to the terminal;

when the matching can not be determined, the MME serving the terminal currently sends context information of the terminal to the group representative MME through a User Datagram Protocol signaling on an S10 reference point, and sends the attach accept message to the terminal;

wherein, the S10 reference point refers to: a reference point between MMEs, which is used for MME relocation and information interaction between the MMEs;

the attach accept message includes: a subscriber characteristic of the terminal, terminal Group Identity and group representative MME identity information.

In step 407, after receiving the attach accept message, the terminal stores the terminal Group Identity by reading the attach accept message, and takes the group representative MME as a new MME serving the terminal currently.

Here, taking the group representative MME as the new MME serving the terminal currently is specifically:

the terminal updating a current serving MME identity in the locally stored information as the group representative MME identity.

If the MME serving the terminal currently is the group representative MME, the terminal does not execute any operations.

EXAMPLE 2

Figure 5:
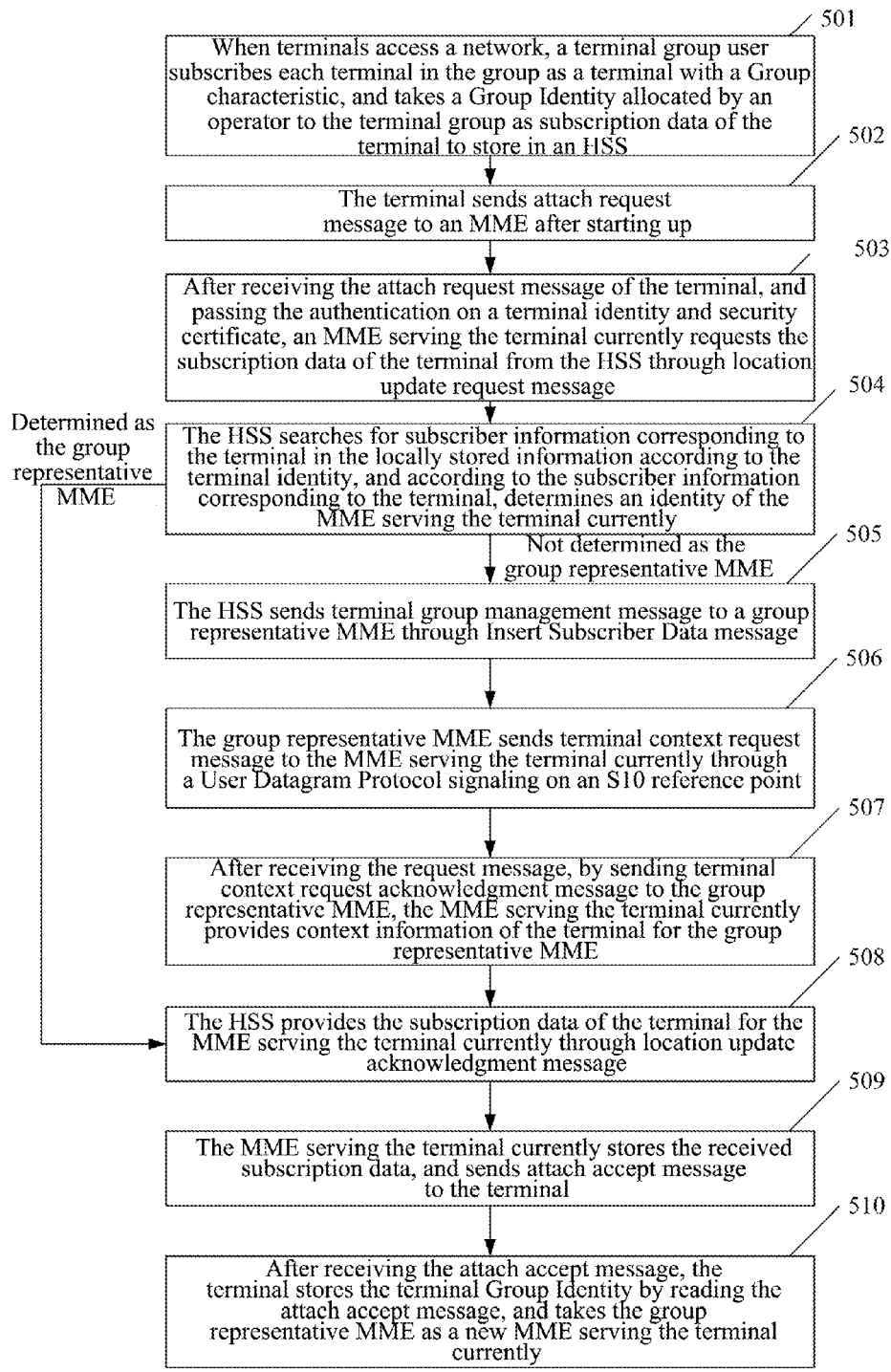
FIG. 5 is a flow diagram of the method for selecting an MME of a terminal group according to the example 2.

An application scenario of the example is that: a group representative terminal is designated by an HSS, the method for selecting an MME of a terminal group according to the example as shown in FIG. 5 includes following steps.

In step 501, when terminals access a network, a terminal group user subscribes each terminal in the group as a terminal with a Group characteristic, and takes a Group Identity allocated by an operator to the terminal group as subscription data of the terminal to store in the HSS.

In step 502, the terminal sends attach request message to the MME after starting up.

Here, the request includes: a terminal identity and a security certificate.

In step 503, after receiving the attach request message of the terminal, and passing the authentication on the terminal identity and security certificate, an MME serving the terminal currently requests the subscription data of the terminal from the HSS through location update request message.

Here, the location update request message includes: a terminal identity and an MME identity; wherein, the terminal identity can be specifically an IMSI; the MME identity can be specifically a GUMMEI.

In step 504, after receiving the request of the MME serving the terminal currently, the HSS searches for subscriber information corresponding to the terminal in the locally stored information according to the terminal identity, and according to the subscriber information corresponding to the terminal, determines an identity of the MME serving the terminal currently. When determining that the current terminal is the HSS and the group representative MME, step 508 is executed, and when determining that the current terminal is the HSS and not the group representative MME, step 505 is executed.

Here, the subscriber information corresponding to the terminal includes: the terminal Group Identity.

According to the subscriber information corresponding to the terminal, determining the identity of the MME serving the terminal currently is specifically:

if the terminal is the group representative terminal designated by the HSS, and the terminal is the first attached terminal of the terminal group, the HSS takes the MME serving the terminal currently as a group representative MME;

if the terminal is the group representative terminal designated by the HSS, and the terminal is not the first attached terminal of the terminal group, or the terminal is not the group representative terminal, the HSS takes the MME serving the terminal currently as a common MME.

In step 505, the HSS sends terminal group management message to the group representative MME through Insert Subscriber data message.

Here, the terminal group management message includes: a common MME identity and a terminal identity; wherein, the common MME identity refers to: the MME serving the terminal currently; the common MME identity is the GUMMEI; the terminal identity can be the IMSI.

In step 506, after receiving the Insert Subscriber data message, the group representative MME sends terminal context request message to the MME serving the terminal currently through a User Datagram Protocol signaling on an S10 reference point.

Here, the terminal context request message includes: the terminal identity; wherein, the terminal identity can be specifically the IMSI.

In step 507, after receiving the request message, by sending terminal context request acknowledgment message to the group representative MME, the MME serving the terminal currently provides context information of the terminal for the group representative MME, and then step 508 is executed.

In step 508, the HSS provides the subscription data of the terminal for the MME serving the terminal currently through location update acknowledgment message.

Here, the subscription data includes: a group representative MME identity and the Group Identity; wherein, the group representative MME identity can be specifically the GUMMEI.

In practical applications, when steps 505~507 and step 508 are executed, no particular order is required, in other words, step 508 can be firstly executed, and then steps 505~507 are executed.

In step 509, the MME serving the terminal currently stores the received subscription data, and sends attach accept message to the terminal.

Here, the attach accept message includes: a subscriber characteristic of the terminal, terminal Group Identity and group representative MME identity information.

In step 510, after receiving the attach accept message, the terminal stores the terminal Group Identity by reading the attach accept message, and takes the group representative MME as a new MME serving the terminal currently.

Here, taking the group representative MME as the new MME serving the terminal currently is specifically:

the terminal updating a current serving MME identity in the locally stored information as the group representative MME identity.

If the MME serving the terminal currently is the group representative MME, the terminal does not execute any operations.

EXAMPLE 3

Figure 6:
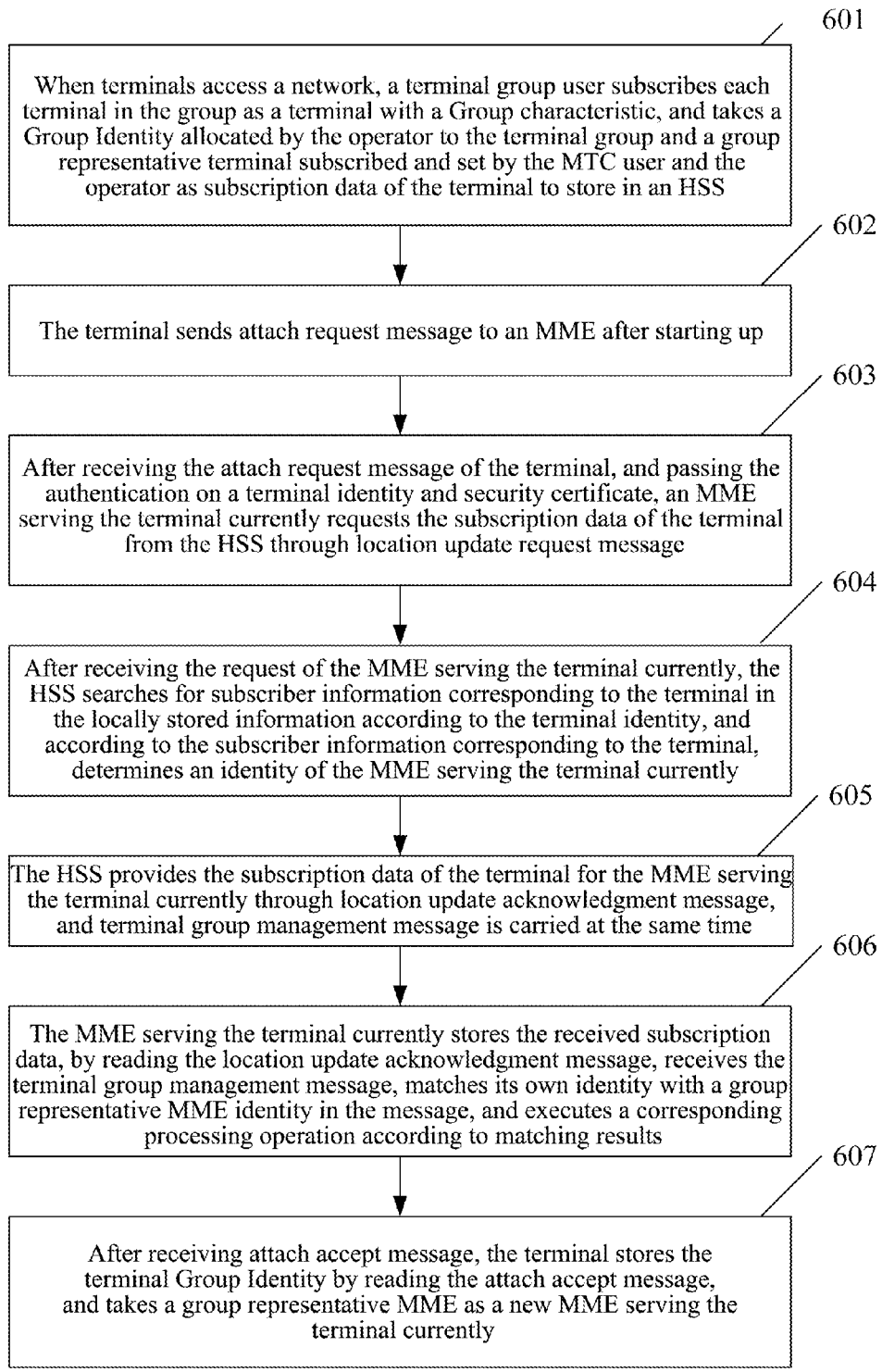
FIG. 6 is a flow diagram of the method for selecting an MME of a terminal group according to the example 3.

An application scenario of the example is that: a group representative terminal is subscribed and set by an MTC user and an operator, the method for selecting an MME of a terminal group according to the example as shown in FIG. 6 includes following steps.

In step 601, when terminals access a network, a terminal group user subscribes each terminal in the group as a terminal with a Group characteristic, and takes a Group Identity allocated by the operator to the terminal group and the group representative terminal subscribed and set by the MTC user and the operator as subscription data of the terminal to store in an HSS.

Here, taking the group representative terminal subscribed and set by the MTC user and operator as the subscription data of the terminal to store in the HSS is specifically:

adding an identity in the information stored by the HSS to indicate the group representative terminal.

In step 602, the terminal sends attach request message to the MME after starting up.

Here, the request includes: a terminal identity and a security certificate.

In step 603, after receiving the attach request message of the terminal, and passing the authentication on the terminal identity and security certificate, an MME serving the terminal currently requests the subscription data of the terminal from the HSS through location update request message.

Here, the location update request message includes: a terminal identity and an MME identity; wherein, the terminal identity can be specifically an IMSI; the MME identity can be specifically a GUMMEI.

In step 604, after receiving the request of the MME serving the terminal currently, the HSS searches for subscriber information corresponding to the terminal in the locally stored information according to the terminal identity, and according to the subscriber information corresponding to the terminal, determines an identity of the MME serving the terminal currently.

Here, the subscriber information corresponding to the terminal includes: the terminal Group Identity.

According to the subscriber information corresponding to the terminal, determining the identity of the MME serving the terminal currently is specifically:

if the terminal is the group representative terminal subscribed and set by the MTC user and operator, the HSS takes the MME serving the terminal currently as a group representative MME;

if the terminal is not the group representative terminal subscribed and set by the MTC user and operator, the HSS takes the MME serving the terminal currently as a common MME.

In step 605, the HSS provides the subscription data of the terminal for the MME serving the terminal currently through location update acknowledgment message, and meanwhile, terminal group management message is carried.

Here, the terminal group management message includes: a group representative MME identity and a terminal identity; wherein, the group representative MME identity can be specifically the GUMMEI; the terminal identity can be specifically the IMSI.

In step 606, the MME serving the terminal currently stores the received subscription data, by reading the location update acknowledgment message, receives the terminal group management message, matches its own identity with the group representative MME identity in the message, and executes a corresponding processing operation according to matching results.

Specifically, when the matching is determined, the MME serving the terminal currently sends attach accept message to the terminal;

when the matching can not be determined, the MME serving the terminal currently sends context information of the terminal to the group representative MME through a User Datagram Protocol signaling on an S10 reference point, and sends the attach accept message to the terminal;

wherein, the S10 reference point refers to: a reference point between MMEs, which is used for MME relocation and information interaction between the MMEs;

the attach accept message includes: a subscriber characteristic of the terminal, terminal Group Identity and group representative MME identity information.

In step 607, after receiving the attach accept message, the terminal stores the terminal Group Identity by reading the attach accept message, and takes the group representative MME as a new MME serving the terminal currently.

Here, taking the group representative MME as the new MME serving the terminal currently is specifically:

the terminal updating a current serving MME identity in the locally stored information as the group representative MME identity.

If the MME serving the terminal currently is the group representative MME, the terminal does not execute any operations.

EXAMPLE 4

Figure 7:
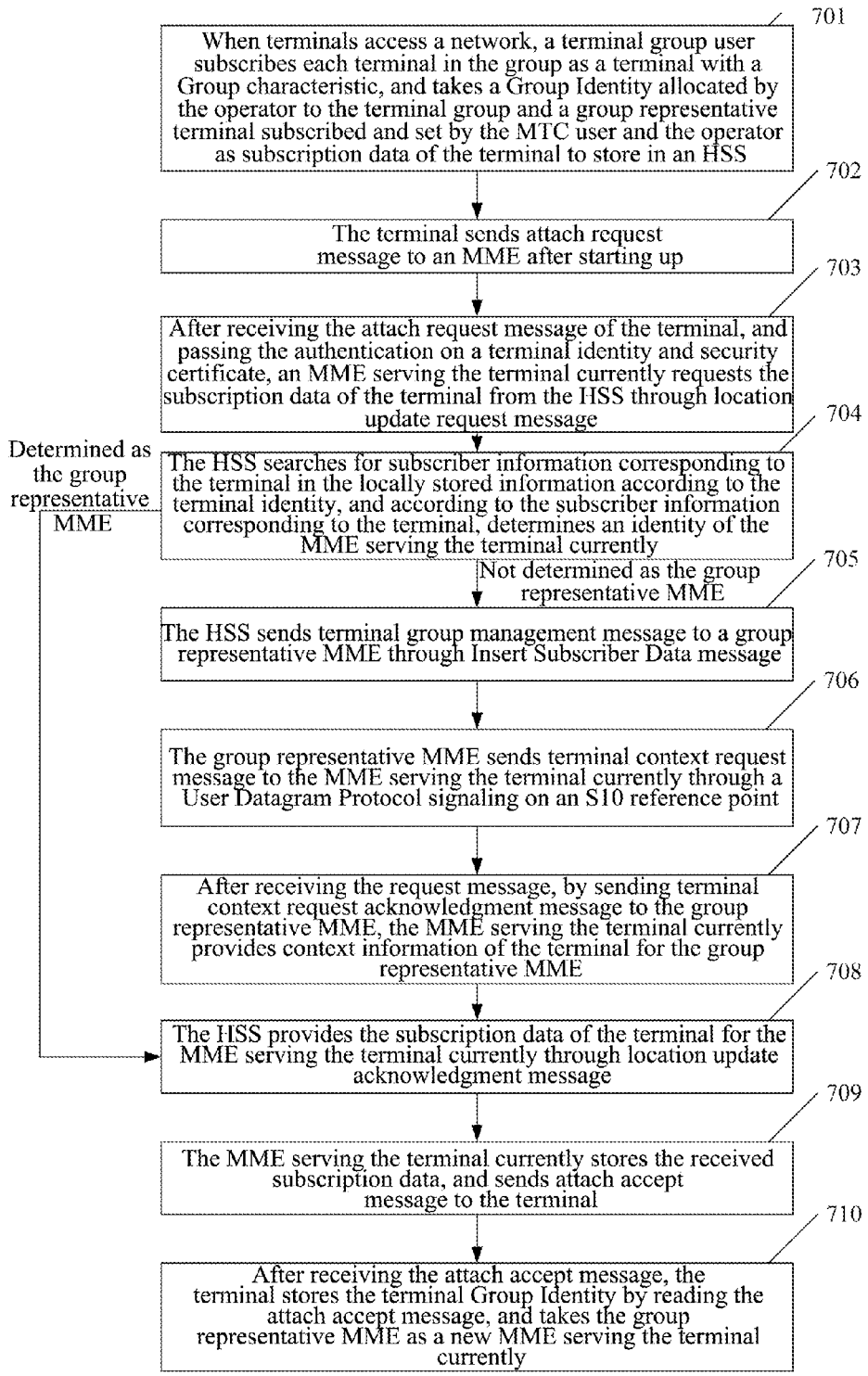
FIG. 7 is a flow diagram of the method for selecting an MME of a terminal group according to the example 4.

An application scenario of the example is that: a group representative terminal is subscribed and set by an MTC user and operator, the method for selecting an MME of a terminal group according to the example as shown in FIG. 7 includes following steps.

In step 701, when terminals access a network, a terminal group user subscribes each terminal in the group as a terminal with a Group characteristic, and takes a Group Identity allocated by the operator to the terminal group and the group representative terminal subscribed and set by the MTC user and the operator as subscription data of the terminal to store in an HSS.

Here, taking the group representative terminal subscribed and set by the MTC user and operator as the subscription data of the terminal to store in the HSS is specifically:

adding an identity in the information stored by the HSS to indicate the group representative terminal.

In step 702, the terminal sends attach request message to the MME after starting up.

Here, the request includes: a terminal identity and a security certificate.

In step 703, after receiving the attach request message of the terminal, and passing the authentication on the terminal identity and security certificate, an MME serving the terminal currently requests the subscription data of the terminal from the HSS through location update request message.

Here, the location update request message includes: a terminal identity and an MME identity; wherein, the terminal identity can be specifically an IMSI; the MME identity can be specifically a GUMMEI.

In step 704, after receiving the request of the MME serving the terminal currently, the HSS searches for subscriber information corresponding to the terminal in the locally stored information according to the terminal identity, and according to the subscriber information corresponding to the terminal, determines an identity of the MME serving the terminal currently. When determining that the current terminal is the HSS and the group representative MME, step 708 is executed, and when determining that the current terminal is the HSS and not the group representative MME, step 705 is executed.

Here, the subscriber information corresponding to the terminal includes: the terminal Group Identity.

According to the subscriber information corresponding to the terminal, determining the identity of the MME serving the terminal currently is specifically:

if the terminal is the group representative terminal subscribed and set by the MTC user and operator, the HSS takes the MME serving the terminal currently as a group representative MME;

if the terminal is not the group representative terminal subscribed and set by the MTC user and operator, the HSS takes the MME serving the terminal currently as a common MME.

In step 705, the HSS sends terminal group management message to the group representative MME through Insert Subscriber data message.

Here, the terminal group management message includes: a common MME identity and a terminal identity; wherein, the common MME identity refers to: the MME serving the terminal currently; the common MME identity is the GUMMEI; the terminal identity can be the IMSI.

In step 706, after receiving the Insert Subscriber data message, the group representative MME sends terminal context request message to the MME serving the terminal currently through a User Datagram Protocol signaling on an S10 reference point.

Here, the terminal context request message includes: the terminal identity; wherein, the terminal identity can be specifically the IMSI.

In step 707, after receiving the request message, by sending terminal context request acknowledgment message to the group representative MME, the MME serving the terminal currently provides context information of the terminal for the group representative MME, and then step 708 is executed.

In step 708, the HSS provides the subscription data of the terminal for the MME serving the terminal currently through location update acknowledgment message.

Here, the subscription data includes: a group representative MME identity and the Group Identity; wherein, the group representative MME identity can be specifically the GUMMEI.

In practical applications, when steps 705~707 and step 708 are executed, no particular order is required, in other words, step 708 can be firstly executed, and then steps 705~707 are executed.

In step 709, the MME serving the terminal currently stores the received subscription data, and sends attach accept message to the terminal.

Here, the attach accept message includes: a subscriber characteristic of the terminal, terminal Group Identity and group representative MME identity information.

In step 710, after receiving the attach accept message, the terminal stores the terminal Group Identity by reading the attach accept message, and takes the group representative MME as a new MME serving the terminal currently.

Here, taking the group representative MME as the new MME serving the terminal currently is specifically:

the terminal updating a current serving MME identity in the locally stored information as the group representative MME identity.

If the MME serving the terminal currently is the group representative MME, the terminal does not execute any operations.

Figure 8:
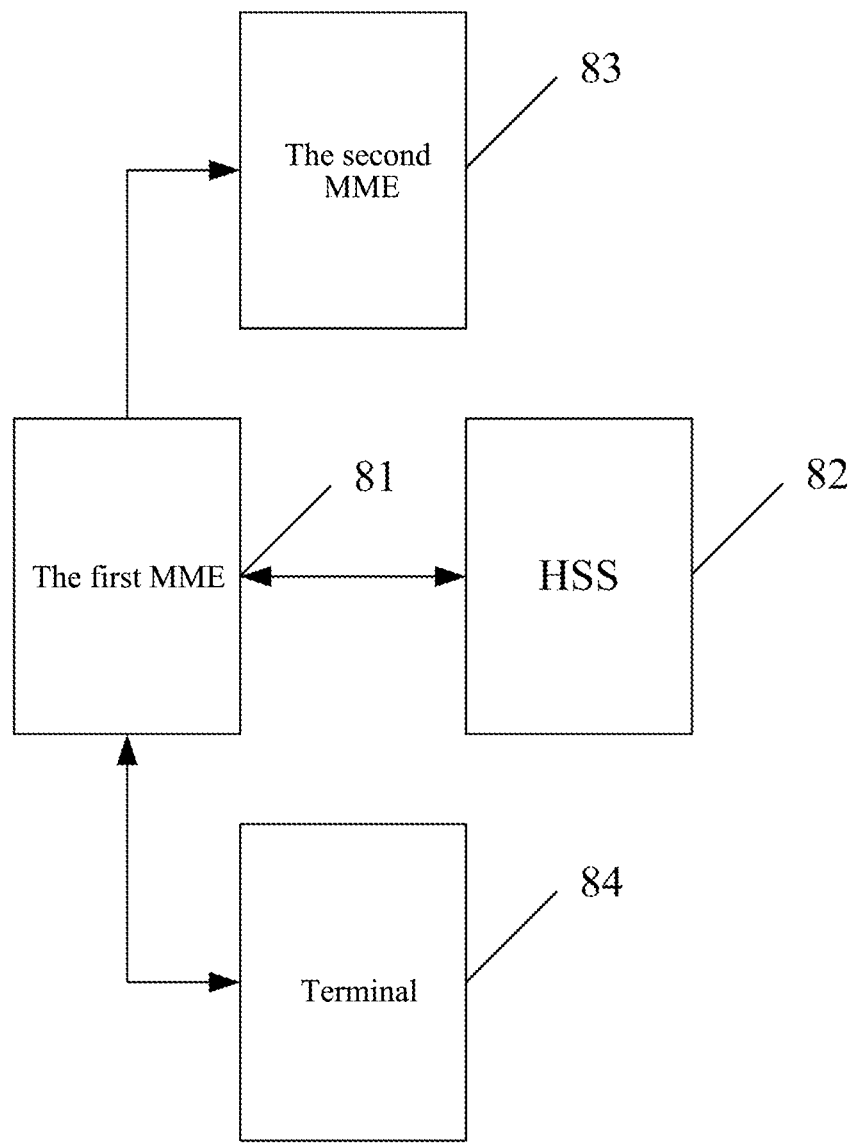
FIG. 8 is a structure diagram of the system for selecting an MME of a terminal group according to the present invention.

In order to implement the method as shown in FIG. 2, the present invention also provides a system for selecting an MME of a terminal group, and as shown in FIG. 8, the system comprises: a first MME 81, an HSS 82, a second MME 83 and a terminal 84; wherein, the first MME 81 is configured to: after receiving attach request message sent by the terminal 84, and determining that no effective subscription data of the terminal exist in local, request the subscription data of the terminal from the HSS 82, and after receiving terminal group management message and the subscription data of the terminal 84 returned by the HSS 82, send context information of the terminal 84 to the second MME 83, and send attach accept message to the terminal 84;

the HSS 82 is configured to: after determining that the first MME 81 is not a group representative MME, return the terminal group management message and the subscription data of the terminal 84 to the first MME 81;

the second MME 83 is configured to: receive the context information of the terminal 84 sent by the first MME 81; and the terminal 84 is configured to: send the attach request message to the first MME 81, and after receiving the attach accept message sent by the first MME 81, take the second MME 83 as a new MME serving the terminal currently.

Here, it should be noted that, the first MME 81 is the MME serving the terminal 84 currently, and the second MME 83 is the group representative MME of the terminal group in which the terminal 84 is located.

Wherein, the HSS 82 is further configured to: take an MME serving a group representative terminal as the group representative MME.

Here, it should be noted that, specific processing processes of the first MME 81, HSS 82, and terminal 84 in the system of the present invention has been described in detail hereinbefore, which will be not repeated.

Figure 9:
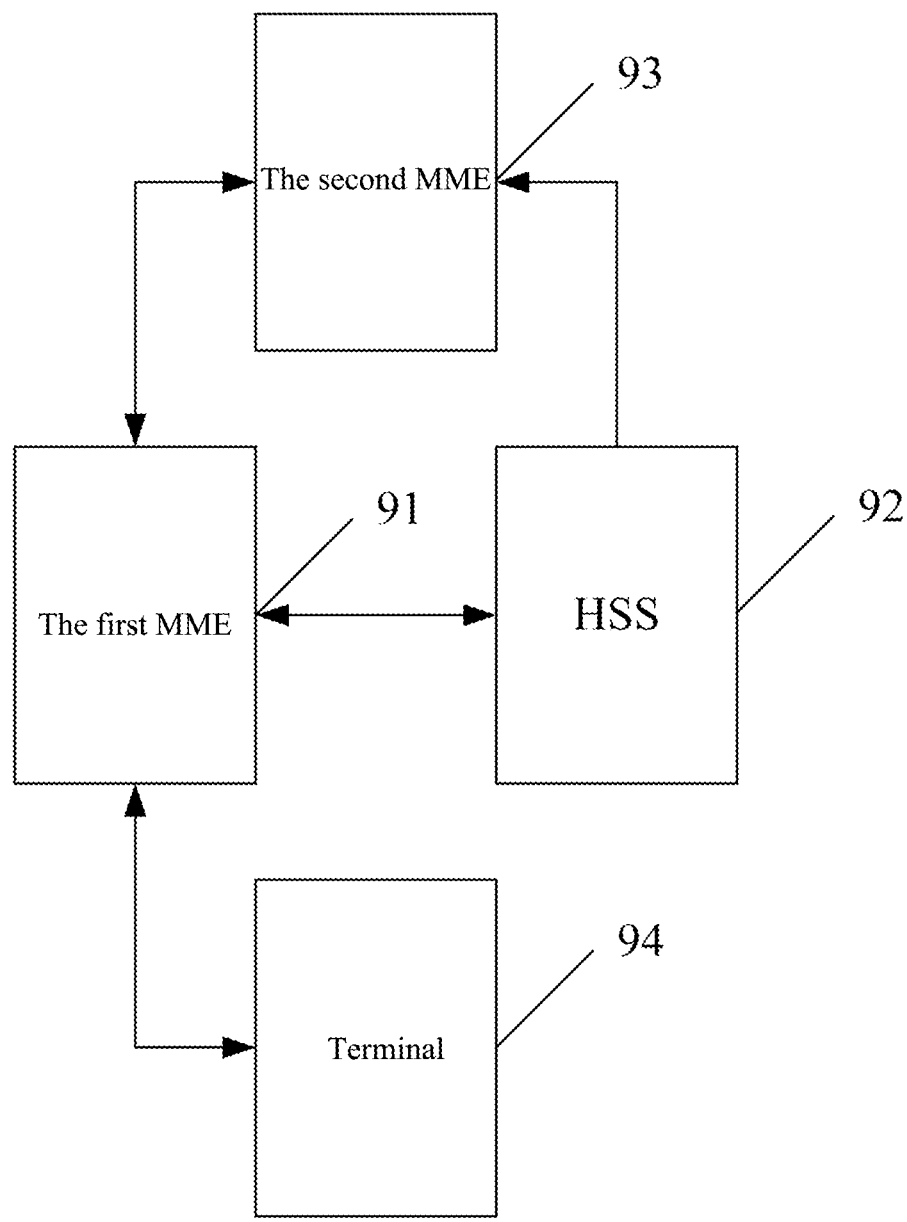
FIG. 9 is a structure diagram of the system for selecting an MME of a terminal group according to the present invention.

In order to implement the method as shown in FIG. 3, the present invention also provides a system for selecting an MME of a terminal group, and as shown in FIG. 9, the system comprises: a first MME 91, an HSS 92, a second MME 93 and a terminal 94; wherein, the first MME 91 is configured to: after receiving attach request message sent by the terminal 94, and determining that no effective subscription data of the terminal exist in local, request the subscription data of the terminal from the HSS 92, store the received subscription data of the terminal 94 returned by the HSS 92, send attach accept message to the terminal 94, and provide context information of the terminal 94 for the second MME 93;

the HSS 92 is configured to: after determining that the first MME 91 is not a group representative MME, send terminal group management message to the second MME 93, and return the subscription data of the terminal 94 to the first MME 91;

the second MME 93 is configured to: after receiving the terminal group management message sent by the HSS 92, according to the terminal group management message, acquire the context information of the terminal 94 from the first MME 91; and the terminal 94 is configured to: send the attach request message to the first MME 91, and after receiving the attach accept message sent by the first MME 91, take the second MME 93 as a new MME serving the terminal currently.

Here, it should be noted that, the first MME 91 is the MME serving the terminal 94 currently, and the second MME 93 is the group representative MME of the terminal group in which the terminal 94 is located.

Wherein, the HSS 92 is further configured to: take an MME serving a group representative terminal as the group representative MME.

Here, it should be noted that, specific processing processes of the first MME 91, HSS 92, second MME 93 and terminal 94 in the system of the present invention has been described in detail hereinbefore, which will be not repeated.

The above description is only the preferred examples of the present invention, which is not used to limit the protection scope of the present invention.

What is claimed is:

1. A method for selecting a Mobility Management Entity (MME) of a terminal group, comprising:

taking a terminal group identity as subscription data of a terminal to store in a Home Subscriber Server (HSS);

after receiving an attach request message sent by a terminal, and determining that no effective subscription data of the terminal exists locally, the MME requesting the subscription data of the terminal from the HSS;

after determining that an MME serving the terminal currently is not a group representative MME, the HSS returning a terminal group management message and the subscription data of the terminal to the MME serving the terminal currently, wherein the subscription data includes a group representative MME identity and the terminal group identity;

the MME serving the terminal currently sending context information of the terminal to the group representative MME corresponding to a group representative MME identity in the terminal group management message, and sending an attach accept message to the terminal; and the terminal taking the MME corresponding to the group representative MME identity in the attach accept message as a new MME serving the terminal currently.

2. The method according to claim 1, before the HSS determines that the MME serving the terminal currently is not the group representative MME, further comprising:

the HSS taking an MME serving a group representative terminal as the group representative MME.

3. The method according to claim 2, before the HSS takes the MME serving the group representative terminal as the group representative MME, further comprising:

the HSS designating the group representative terminal; or a Machine Type Communication (MTC) user and an operator subscribing to set the group representative terminal, and saving the set group representative terminal in the HSS.

4. The method according to claim 1, wherein, sending the context information of the terminal to the group representative MME corresponding to the group representative MME identity in the terminal group management message comprises:

the MME serving the terminal currently sending the context information of the terminal to the group representative MME through a signaling on an S10 reference point.

5. The method according to claim 1, wherein, taking the MME corresponding to the group representative MME identity in the attach accept message as the new MME serving the terminal currently comprises:

the terminal updating a current serving MME identity in locally stored information as the group representative MME identity.

6. A method for selecting an MME of a terminal group, comprising:

taking a terminal group identity as subscription data of a terminal to store in a Home Subscriber Server (HSS);

after receiving an attach request message sent by a terminal, and determining that no effective subscription data of the terminal exists locally, the MME requesting the subscription data of the terminal from the HSS;

after determining that an MME serving the terminal currently is not a group representative MME, the HSS sending a terminal group management message to the group representative MME, and returning the subscription data of the terminal to the MME serving the terminal currently, wherein the subscription data includes a group representative MME identity and the terminal group identity;

the group representative MME acquiring context information of the terminal from the MME serving the terminal currently according to the terminal group management message, and the MME serving the terminal currently storing received subscription data and sending an attach accept message to the terminal; and the terminal taking the MME corresponding to a group representative MME identity in the attach accept message as a new MME serving the terminal currently.

7. The method according to claim 6, before the HSS determines that the MME serving the terminal currently is not the group representative MME, further comprising:

the HSS taking an MME serving a group representative terminal as the group representative MME.

8. The method according to claim 7, before the HSS takes the MME serving the group representative terminal as the group representative MME, further comprising:

the HSS designating the group representative terminal; or an MTC user and an operator subscribing to set the group representative terminal, and saving the set group representative terminal in the HSS.

9. The method according to claim 6, wherein, sending the terminal group management message to the group representative MME comprises:

the HSS sending the terminal group management message to the group representative MME through a signaling on an S6a reference point.

10. The method according to claim 6, wherein, acquiring the context information of the terminal from the MME serving the terminal currently comprises:
the group representative MME sending terminal context request message to the MME serving the terminal currently through a signaling on an S10 reference point;
the MME serving the terminal currently providing the context information of the terminal for the group representative MME by sending terminal context request acknowledgment message to the group representative MME.

11. The method according to claim 6, wherein, taking the MME corresponding to the group representative MME identity in the attach accept message as the new MME serving the terminal currently comprises:
the terminal updating a current serving MME identity in locally stored information as the group representative MME identity.

12. A system for selecting an MME of a terminal group, comprising: a first MME, an HSS, a second MME and terminals; wherein, the first MME is configured to: after receiving an attach request message sent by a terminal, and determining that no effective subscription data of the terminal exists locally, request the subscription data of the terminal from the HSS, and after receiving a terminal group management message and the subscription data of the terminal returned by the HSS, send context information of the terminal to the second MME, and send an attach accept message to the terminal;
the HSS is configured to: after determining that the first MME is not a group representative MME, return the terminal group management message and the subscription data of the terminal to the first MME, wherein the subscription data includes a group representative MME identity and the terminal group identity;
the second MME is configured to: receive the context information of the terminal sent by the first MME; and
the terminal is configured to: send the attach request message to the first MME, and after receiving the attach accept message sent by the first MME, take the second MME as a new MME serving the terminal currently;
the HSS is further configured to: store a terminal group identity as the subscription data of the terminal.

13. The system according to claim 12, wherein, the HSS is further configured to:
take an MME serving a group representative terminal as the group representative MME.

14. A system for selecting an MME of a terminal group, comprising: a first MME, an HSS, a second MME and terminals; wherein,
the first MME is configured to: after receiving an attach request message sent by a terminal, and determining that no effective subscription data of the terminal exists locally, request the subscription data of the terminal from the HSS, store received subscription data of the terminal returned by the HSS, send an attach accept message to the terminal, and provide context information of the terminal for the second MME;
the HSS is configured to: after determining that the first MME is not a group representative MME, send a terminal group management message to the second MME, and return the subscription data of the terminal to the first MME, wherein the subscription data includes a group representative MME identity and the terminal group identity;
the second MME is configured to: after receiving the terminal group management message sent by the HSS, according to the terminal group management message, acquire the context information of the terminal from the first MME; and
the terminal is configured to: send the attach request message to the first MME, and after receiving the attach accept message sent by the first MME, take the second MME as a new MME serving the terminal currently;
the HSS is further configured to: store a terminal group identity as the subscription data of the terminal.

15. The system according to claim 14, wherein, the HSS is further configured to:
take an MME serving a group representative terminal as the group representative MME.

* * * * *

UNITED STATES PATENT AND TRADEMARK OFFICE
CERTIFICATE OF CORRECTION

| | | |
|---|---|---|
| PATENT NO. | : 8,958,792 B2 | Page 1 of 1 |
| APPLICATION NO. | : 13/634087 | |
| DATED | : February 17, 2015 | |
| INVENTOR(S) | : Kun Yang et al. | |

It is certified that error appears in the above-identified patent and that said Letters Patent is hereby corrected as shown below:

On the title page, please insert item (30):
--(30) Foreign Application Priority Data
Sept. 23, 2011 (CN)...................201110285549.6--

Signed and Sealed this
Fourteenth Day of July, 2015

Michelle K. Lee
*Director of the United States Patent and Trademark Office*